Oct. 9, 1962     O. M. SEALANDER     3,057,617

STAND FOR WHEEL ALIGNING DEVICE

Filed July 1, 1959

Oscar M. Sealander
INVENTOR.

BY *Clarence A. O'Brien
and Harvey B. Jacobson*
Attorneys

United States Patent Office

3,057,617
Patented Oct. 9, 1962

3,057,617
STAND FOR WHEEL ALIGNING DEVICE
Oscar M. Sealander, 316 8th St., Gothenberg, Nebr.
Filed July 1, 1959, Ser. No. 824,226
3 Claims. (Cl. 269—46)

This application is a continuation-in-part application of U.S. Serial No. 524,525, filed July 26, 1955, now Patent No. 2,921,379, granted January 19, 1960.

This invention relates in general to new and useful improvements in automotive repair equipment and more specifically to an improved stand for utilization in combination with wheel aligning devices.

In order that the front wheels of an automobile may be properly aligned, it is necessary that the wheels not only be properly toed in or out, which may be accomplished by a relatively simple tool, but also must be adjusted so as to have the proper caster and camber. The caster of a vehicle wheel is the angle in a longitudinal vertical plane between the vertical and the kingpin center line. The camber of a wheel is the angle in a transverse vertical plane between the vertical and the longitudinal plane passed through the wheel. In order to measure the caster and camber of a vehicle wheel, there has been heretofore provided complicated machines which are relatively expensive and also require a relatively great amount of space in a garage.

In U.S. Serial No. 524,525, the applicant discloses a wheel aligning device and means for supporting the front wheel hubs on a stand for loading the front spindles, with the wheels removed, in a manner similar to the load carried thereby with the wheels in place. It was indicated that an original measurement should be made from the wheels to the spindle center line with the tires properly inflated. Then, with the wheels removed, the front wheel hubs were supported in the stands at a height equal to the measured height for duplicating the loaded condition. Thereafter, the wheel aligning device was utilized to measure the caster and camber.

Accordingly, it is the principal object of this invention to provide an improved wheel aligning assembly which includes a stand for supporting a front hub at a desired height with the front wheels removed so that the spindle of the front wheel hub may be readily adjusted in order to set the caster and camber thereof with a proper wheel aligning device.

It is a more particular object of this invention to provide a novel stand construction for supporting the front wheel hubs of an automobile which is vertically adjustable and accordingly versatile in use.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
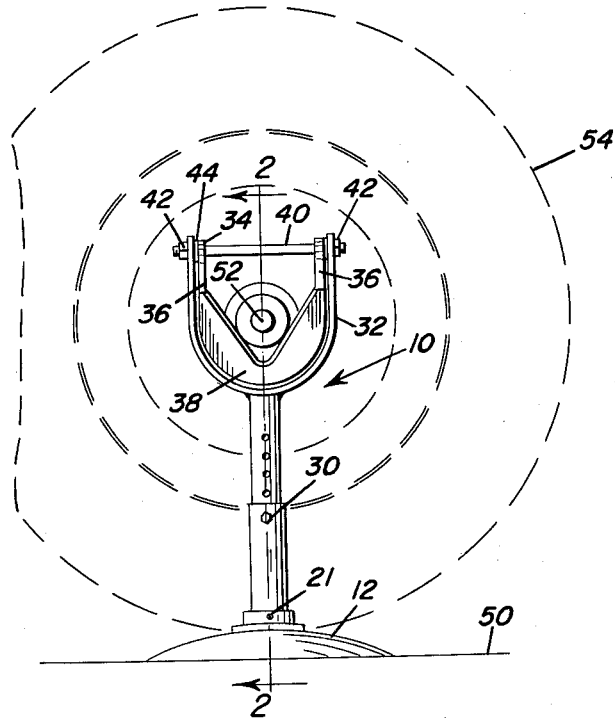
FIGURE 1 is an elevational view of the wheel stand utilized for the purpose of supporting a front wheel vehicle hub when a wheel thereof is removed, the front wheel hub being shown in elevation with the remainder of the vehicle omitted for the purposes of clarity.
Figure 2:
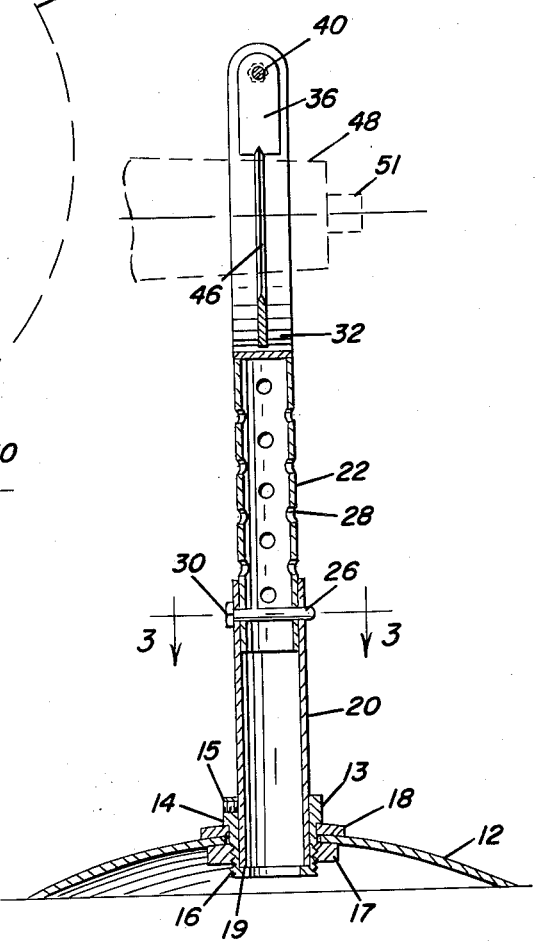
FIGURE 2 is an enlarged vertical sectional view taken substantially along the plane 2—2 of FIGURE 1 and shows the details of the stands.
Figure 3:
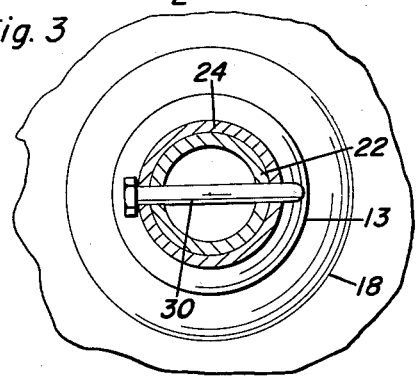
FIGURE 3 is an enlarged horizontal sectional view taken substantially along the plane 3—3 of FIGURE 2 and illustrates the pin utilized for retaining the telescoped standards of the stand utilized to retain the stand at the desired height.
Figure 4:
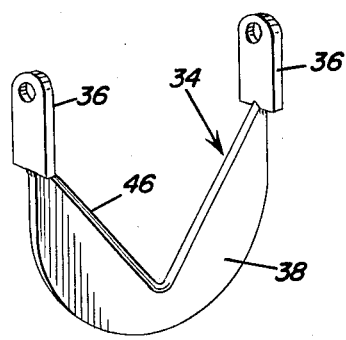
FIGURE 4 is an enlarged perspective view of the inner yoke utilized to support the wheel hub.

With continuing reference to the drawings, numeral 10 generally represents the wheel stand comprising this invention. The wheel stand 10 includes a circular, concavo-convex base 12 which is in the form of a portion of a spherical surface. An aperture in the base 12 receives a mounting sleeve or ring 13 therethrough which has an enlarged upper portion 14 including a threaded opening 15. The lower portion of the mounting ring 13 is reduced and externally threaded at 16. A nut 17 is threadedly engaged on the threaded portion 16 of the mounting ring 13 and secures the mounting ring to the base 12. A washer 18 is disposed around the reduced portion 16 of the mounting ring 13 beneath the enlargement 14. The mounting ring 13 defines a cylindrical passage therethrough and a shoulder or flange 19 in the lower end portion of said ring. A lower tubular standard 20 is received within the cylindrical passage and rests on the shoulder 19 and is secured in the mounting ring 13 by a setscrew 21 engaged in the threaded opening 15 of the mounting ring 13.

Telescoped within the upper end of the lower tubular standard 20 is an upper tubular standard 22. The standards 20 and 22 are provided with vertically spaced, horizontally aligned apertures or openings 26 and 28 respectively, through which a pin 30 may be selectively positioned to retain the standards 20 and 22 in selective telescoped relation. Thus, a tubular, telescopically adjustable standard or post is provided.

Secured to the upper end of the upper tubular standard 22 is an outer yoke 32. Supported by the outer yoke 32 is an inner yoke or hanger 34. The inner yoke 34 includes a pair of supporting legs 36 which have their lower ends connected together by a bite portion 38. The legs 36 are pivotally connected to the upper part of the outer yoke 32 by means of a generally horizontal shaft 40. The shaft 40 extends through aligned apertures in the legs of the outer yoke 32 and inner yoke 38 and are retained by nuts 42 disposed outwardly of the yoke 32. Washers 44 may be provided on the shaft 40 between the yokes.

The bight portion 38 of the inner yoke or hanger 34 comprises a V-shaped tapered edge 46 for receiving the wheel hub 48.

In accordance with the teachings set forth in the parent application U.S. Serial No. 524,525, after the wheel is removed from the wheel hub 48 rotatably carried by the spindle 50, the wheel hub is supported on the V-shaped, tapered edge 46 forming a portion of the bight portion 38 of the inner yoke 34. This is done so that the automobile may be loaded substantially in the same manner as if all the automobile wheels were in place. In order to establish the proper loading position the distance between the ground 50 and spindle center line 52 are measured. Then, the wheels 54 are removed and the hub 48 supported by the stand 10 so that the spindle center line 52 is at the same level as in the loaded condition.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A stand for supporting a mounted vehicle wheel hub during an aligning operation, said stand comprising a generally concavo-convex, circular base having a centrally located, circular opening therein, an externally threaded sleeve mounted in the opening and including an enlargement on its upper end, and further including a flange in its lower end portion, a washer on the sleeve interposed between the enlargement and the base, a retaining nut threaded on the sleeve beneath the base, a standard removably mounted in the sleeve and resting on the flange, a setscrew in the enlargement removably securing the standard in the sleeve, an upstanding yoke on the upper end of the standard, a horizontal shaft mounted on the end portions of said yoke, and a generally U-shaped hanger, for the reception of a wheel hub, pivotally suspended from said shaft and swingable in the yoke.

2. A stand in accordance with claim 1, wherein said standard includes tubular, telescopically adjustable male and female sections having selectively registrable openings therein, and a pin insertable in the registering openings for securing the adjustment of said sections.

3. A stand in accordance with claim 1, wherein said hanger includes a V-shaped, tapered edge for receiving thereon and centering the hub.

References Cited in the file of this patent

UNITED STATES PATENTS

| | | |
|---|---|---|
| 591,249 | Emery | Oct. 5, 1897 |
| 1,444,900 | Blaw | Feb. 13, 1923 |
| 1,806,074 | Macgregor | May 19, 1931 |
| 2,392,549 | Rice | Jan. 8, 1946 |
| 2,846,761 | Evans | Aug. 12, 1958 |

FOREIGN PATENTS

| | | |
|---|---|---|
| 137,129 | Great Britain | Jan. 8, 1920 |